Sept. 11, 1928.  
W. E. SYKES  
FLEXIBLE SHAFT COUPLING  
Filed June 7, 1926  
1,683,999  
2 Sheets-Sheet 1
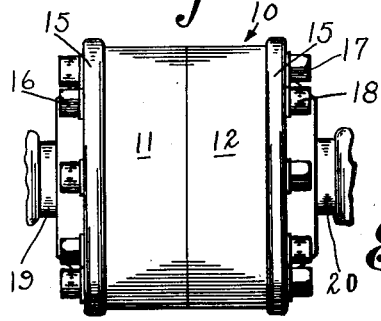
*Fig. 1.*
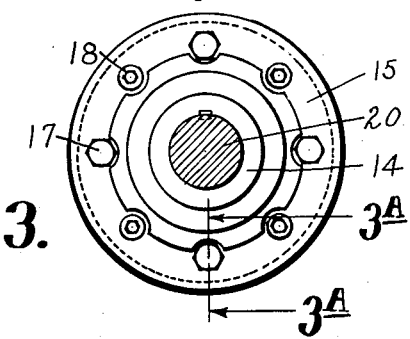
*Fig. 2.*
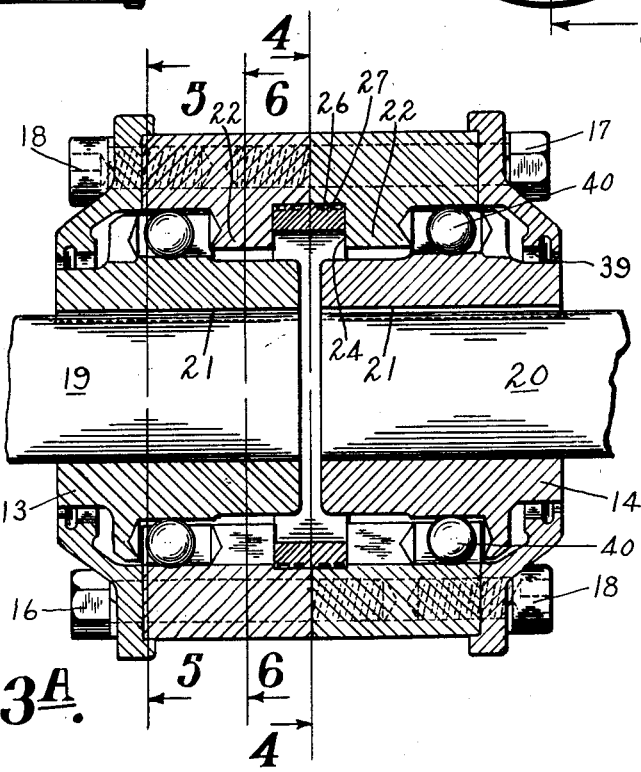
*Fig. 3.*
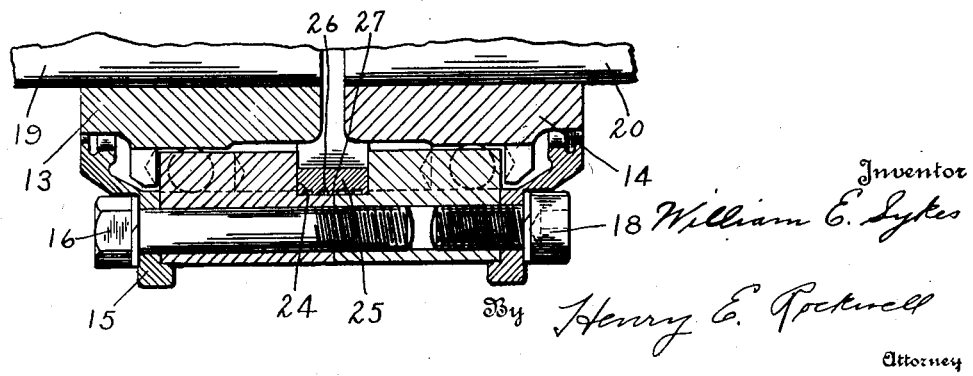
*Fig. 3ᴬ.*
Inventor  
William E. Sykes  
By Henry E. Rockwell  
Attorney Sept. 11, 1928.   W. E. SYKES   1,683,999

FLEXIBLE SHAFT COUPLING

Filed June 7, 1926   2 Sheets-Sheet 2

Inventor
William E. Sykes
By Henry E. Rockwell
Attorney

Patented Sept. 11, 1928.

1,683,999

UNITED STATES PATENT OFFICE.

WILLIAM E. SYKES, OF BUFFALO, NEW YORK.

FLEXIBLE SHAFT COUPLING.

Application filed June 7, 1926. Serial No. 114,173.

This invention relates to flexible or universal couplings for connecting the ends of abutting shafts or the like together. More especially this invention contemplates improvements in couplings designed for such use, wherein rotatable members are interposed between the operating parts thereof to allow freedom of movement between the connected shafts, during the rotation thereof, in angular, axial and lateral directions, so as to prevent vibration and undue friction at the shaft bearings, due to possible misalignment of the connected shafts. The coupling to be hereinafter described is somewhat similar to the coupling described and claimed in an application of William E. Sykes, Serial No. 753,458 filed December 2nd, 1924, and another co-pending application Serial No. 114,174 filed June 7, 1926, and in certain aspects may be considered as an improvement thereover or a modification thereof.

One of the objects of this invention is to provide a coupling of novel structure which will be inexpensive to manufacture, efficient in use, and readily installed.

Another object of this invention is to provide a coupling wherein certain of the parts may be readily disassembled from the remainder without interfering with or disturbing the remaining parts.

Still another object of this invention is to provide a coupling wherein there is a minimum number of parts which will be economical to manufacture, and which will co-operate to produce an efficient device.

Still another object of this invention is to provide in a coupling, economical and efficient means to prevent leakage of retained lubricant between the parts thereof and from the coupling.

To these and other ends, the invention consists in the novel features and combinations of parts to be hereinafter described and claimed.

Figure 4:
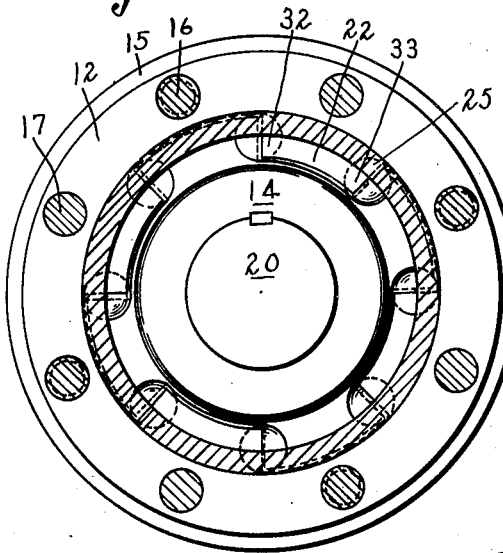
Figure 5:
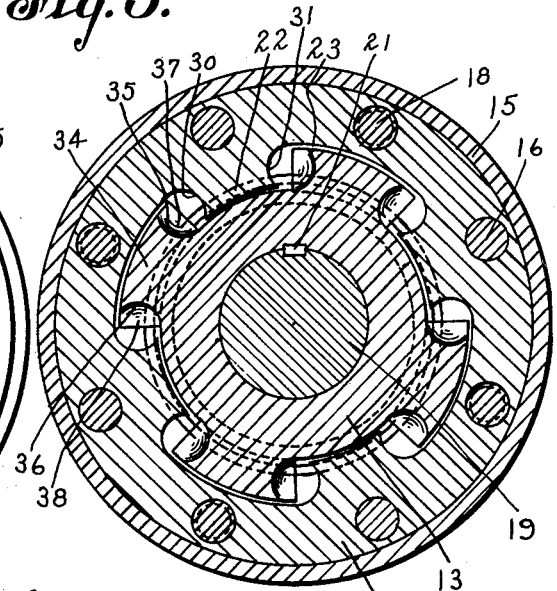
Figure 6:
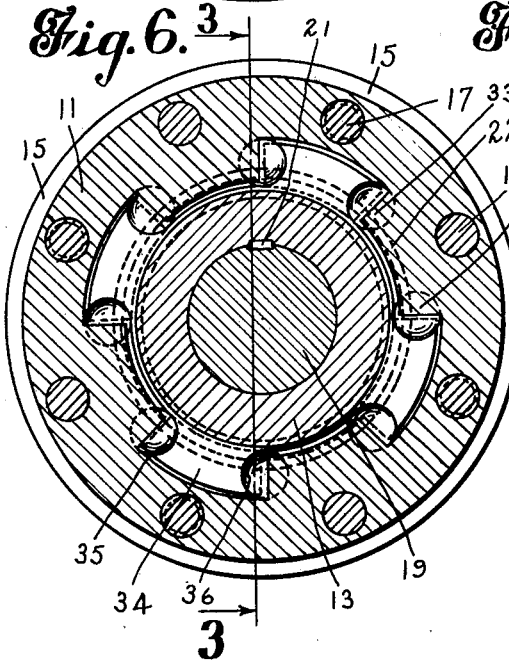
Figure 7:
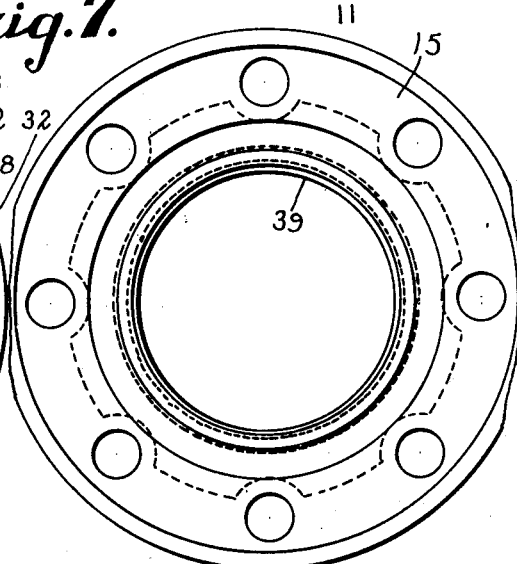

In the accompanying drawings:
Fig. 1 is an elevation of a coupling embodying the features of this invention;
Fig. 2 is an end view of the same;
Fig. 3 is a section on line 3—3 of Fig. 6;
Fig. 3A is a sectional view on 3A—3A of Fig. 2;
Fig. 4 is sectional view on line 4—4 of Fig. 3;
Fig. 5 is a sectional view on line 5—5 of Fig. 3;
Fig. 6 is a sectional view on line 6—6 of Fig. 3, and
Fig. 7 is an inside face view of an end plate used with the coupling shown.

The coupling illustrated in the drawings comprises an outer casing 10, which is, in this instance, composed of two portions 11 and 12, inner members 13 and 14, and end plates 15. The outer casing portions 11 and 12 are secured together by means of a series of screws 16 and 17. The screws 16 pass through openings in the plate 15 and the outer casing portion 11, threading into portion 12, while the screws 17 pass through openings in the opposite plate 15 and the portion 12, threading into the outer casing portion 11. Alternating with the screws 16 and 17 are screws 18, which provide the means whereby the end plates 15 are respectively secured to the outer casing portions 11 and 12. The screws 18 pass through the plates 15 and thread into portions 11 and 12, respectively. The inner members or shaft hubs 13 and 14 are keyed to opposing shaft ends 19 and 20, respectively, by means of the keys 21.

The outer casing portions 11 and 12 are hollow and about their interior periphery are each provided with a series of depending lugs 22 that extend axially inwardly from the outer ends thereof a greater part of the entire width of the casing portion. Spaces 23 are formed between the lugs 22. At the inner ends of the lugs 22 the portions 11 and 12 are recessed to a greater diameter than the diameter thereof at the spaces 23. The recessed part of each portion forms an axially directed shoulder 24 upon each portion. Between the shoulders 24 a lubricant retaining ring 25 is clamped when the screws 16 and 17 secure the two portions 11 and 12 together.

Each of the lugs 22 of the outer casing is provided with grooves 30 and 31, one groove in each side face thereof. The grooves 30 and 31 extend axially and inwardly from each end of the casing along the side faces of the lugs 22 a greater part of the length of the lug. The remaining portions 32 and 33 of the lugs beyond the termination of the grooves axially form stops or closures for the the inner ends of the grooves 30 and 31, respectively.

The inner members 13 and 14 have outwardly extending lugs 34 upon their peripheries intermediate their ends. Each of the lugs 34 is provided with grooves 35 and 36. The grooves 35 and 36 extend axially and outwardly from the inner end of the lug 34 a greater portion of the length of the lug, the remaining portions 37 and 38 of the lugs 34, beyond the termination of the grooves thereof, forming stops or closures for the outer ends of the grooves 35 and 36. Inwardly and axially from the inner ends of the lugs 34, the inner members 13 and 14 are reduced in diameter sufficiently to clear the inner diameter of the casing across the lugs 22 thereof. Outwardly and axially from the outer ends of the lugs 34 the inner members are reduced in diameter sufficiently to clear the material about an opening 39 in the outer caps 15.

The lubricant retaining ring 25 is preferably formed from a piece of seamless tubing having an interior diameter of lesser dimension than the interior diameter of the outer casing across the spaces 23. The periphery of the lubricant retaining ring 25 is grooved as at 26 to form spaced ribs 27, the purpose of which is to trap any lubricant that may seep through from the interior of the coupling, and to prevent its passage between the casing portions 11 and 12.

The coupling is preferably assembled by inserting an inner member within a portion of the outer casing in such a manner that the lugs 34 thereof are within the spaces 23 and between lugs 22 of the outer casing, whereby the lugs 22 will be within the spaces 29 formed between the lugs 34 of the inner member. A rotatable member 40 is placed within the openings formed between the side faces of lugs 22 and 34 by the coinciding grooves 30 and 31 and 35 and 36. The rotatable member 40 is preferably spherical in form. An end plate 15 is then secured to the outer casing portion by means of the screws 18. This assembly forms one unit of the coupling and is keyed to a shaft end by means of a key 21, whereby the shaft end is interlocked with the inner member. The other parts of the coupling are likewise assembled and keyed to the other shaft end. The cooperation of the rotatable member or balls 40, the stops or groove closures 32 and 33 on the outer member, and the stops or groove closures 37 and 38 of the inner member, prevents the inner member from being axially removed from the outer member.

The two units of the coupling after being assembled and keyed to their respective shaft ends, are secured together after properly positioning the lubricant retaining ring 25 between the same, by inserting screws 17 through the end cap 15 and the outer casing portion 12 and threading them into portion 11. Similarly, screws 16 are passed through end cap 15 and portion 11 and screwed into portion 12. By the above described novel manner of securing the units of the coupling and parts thereof together, it is obvious that the same are especially accessible in case it is desired to repair or inspect the interior of the coupling. For instance, by removing screws 18 and 16, the cap 15, adjacent the inner member 13, may be removed without disturbing the outer casing portion 12, and likewise by removing screws 18 and 17, the inner member 14 may be removed without disturbing the outer casing portion 12 or the interior parts thereof.

Preferably, the screws 18 are of a type which requires a special tool to unloosen them, so that the units above described will be assembled at the manufacturing plant and will not be disturbed except by one who is qualified and in possession of these special tools. Screws 18 are shown as socket screws requiring a particular form of wrench to operate them. The screws 16 and 17, however, are of standard form and are the only ones the workmen need to remove while installing the coupling.

In operation, assuming that the shaft end 19 is the driver, the connected hub or inner member 13, the lugs 34, the rotatable members 40, and the lugs 22 of the outer casing, drive the outer casing which in turn, through lugs 22, rotatable members 40, lugs 34, and the inner member 14 connected to the shaft end 20, drives the shaft 20. As described in the co-pending applications above identified, the shafts 19 and 20 may be offset from each other either laterally, vertically or angularly, with no disadvantage being present due to binding of the coupling parts, undue friction upon the shaft bearings, or vibration because of the misalignment between the shafts. The coupling illustrated will take care of any kind of misalignment whether it be angular, offset or combined angular and offset, it being understood that the misalignment is, of course, within limits, which, in this instance, is approximately 5 degrees for angularity and 4% of the maximum shaft diameter for the offset.

While I have shown and described a preferred embodiment of my invention, it is to be understood that it is not limited to all the details shown, but is capable of many modifications and variations which will lie within the spirit of the invention and the scope of the appended claims.

What I claim is:

1. In a coupling for shafts or the like, a hollow casing and a hub member enclosed thereby, said casing having spaced apart depending lugs upon its internal periphery, said lugs having grooves in the side faces thereof extending inwardly from the outer end of said casing the greater part of the length thereof, the remaining portion of said lugs forming closure members for said grooves, said hub member having spaced apart outwardly extending lugs upon its periphery, said hub member lugs being adapted to enter the spaces between the lugs of said casing and having grooves in the side faces and open at the inner end thereof and extending outwardly from the inner end thereof the greater part of the length thereof, the remaining portions of said lugs forming closure members for said grooves, and a rotatable member interposed between the opposing sides of said lugs within the grooves therein.

2. In a coupling for connecting two shaft ends together, a hub member secureable to each shaft end and having spaced apart upstanding lugs upon its exterior periphery, an outer casing portion about each of said hub members and having spaced apart depending lugs upon its interior periphery, said casing lugs being adapted to be received between the lugs of said hub member whereby the side surfaces of the lugs of the respective members will be in opposed relation, rotatable member between the sides of the aforesaid opposed lugs to drivingly connect said hub member and said casing, an outer end plate extending over the outer end of each hub member to retain the same against axial movement in one direction, means to secure each end plate to the adjacent casing portion, and means passing through said end plates to connect said casing portions together whereby each casing portion with its cooperating hub member and end plate is removable from the other without disturbing the other and its cooperating hub member and end plate.

3. In a coupling for shafts or the like, a hollow casing and a hub member enclosed thereby, said casing having spaced apart depending lugs upon its internal periphery, said lugs having grooves in the side faces thereof extending inwardly from the outer end of said casing, said hub member having spaced apart outwardly extending lugs upon its periphery, said hub member lugs being adapted to enter the spaces between the lugs of said casing, and having grooves in the side faces thereof extending outwardly from the inner end thereof, the grooves in said hub member lugs coinciding with the grooves in the casing lugs to form openings therebetween, and a rotatable member disposed within each of the openings so formed, the ungrooved portion of each of said casing lugs forming an interior stop to prevent the displacement of said rotatable member axially in one direction therefrom, and the ungrooved portion of each of said hub member lugs forming an exterior stop to prevent the displacement of said rotatable member from the aforesaid opening axially in another direction.

4. A coupling for connecting two shaft ends together, comprising an outer casing composed of two halves, and a hub member adapted to be secured to each shaft end disposed within each casing half in driving engagement therewith, an end plate on the outer ends of said coupling, threaded means to secure each of said plates to the adjacent casing half, and separate threaded means passing through said plate at each end and through the adjacent casing half to secure the two halves of said outer casing together.

5. A coupling for shafts or the like, comprising a hollow casing, said casing being composed of two portions rigidly securable to each other in axial alignment, a lubricant retaining ring interposed between annular shoulders upon the internal periphery of each casing portion, a hub member enclosed by each casing portion and being adapted to be secured to a shaft end, each of said hub members having a series of spaced apart outstanding lugs upon its external periphery adapted to enter into spaces formed in the cooperating casing portion upon the internal periphery thereof, an end plate over the outer ends of said coupling, means passing through each of said end plates and its adjacent casing portion, engaging the abutting casing portion to secure the two casing portions together, and means separate from the first mentioned means to secure each of said end plates to its adjacent casing portion.

6. A coupling for shafts or the like, comprising a hollow casing, said casing being composed of two portions rigidly securable to each other in axial alignment, a hub member enclosed by each casing portion and being adapted to be secured to a shaft end, each of said hub members having a series of spaced apart outstanding lugs upon its external periphery adapted to enter into openings formed in the cooperating casing portion at the internal periphery thereof, an end plate over the outer ends of said coupling, means passing through each of said end plates, and its adjacent casing portion engaging the abutting casing portion to secure the two casing portions together, and means separate from the first mentioned means to secure each of said end plates to its adjacent casing portion, said first mentioned means being removable to allow the separation of one casing portion from the other without disturbing the hub members and end plates of both from their previously assembled positions.

7. In a coupling for shafts or the like, an outer casing comprising separable portions, each casing portion having spaced apart depending lugs upon its internal periphery, said lugs having grooves in the side faces thereof extending inwardly from the outer end of said casing portion, a hub member enclosed by each of said casing portions and axially movable relatively thereto, each of said hub members having spaced apart outwardly extending lugs upon its periphery, said hub member lugs being adapted to enter the spaces between lugs of the cooperating casing portion, and having grooves in the side faces and open at the inner end thereof and extending outwardly from the inner end thereof, means to limit the axial movement of each of said hub members, and rotatable members interposed between the opposing sides of said lugs within the grooves therein.

8. In a coupling for shafts or the like, an outer casing comprising separable portions, each casing portion having spaced apart depending lugs upon its internal periphery, said lugs having grooves in the side faces thereof extending inwardly from the outer end of said casing portion, a hub member enclosed by each of said casing portions and axially movable relatively thereto, each of said hub members having spaced apart outwardly extending lugs upon its periphery, said hub member lugs being adapted to enter the spaces between lugs of the cooperating casing portion and having grooves in the side faces thereof extending outwardly from the inner end thereof, means to limit the axial movement of each of said hub members, said means comprising a ring-shaped member adapted to be retained between said casing portions, and rotatable members interposed between the opposing sides of said lugs within the grooves therein.

9. In a coupling for shafts or the like, a hollow casing comprising a pair of separable parts, each casing part having a series of lugs depending from the interior periphery thereof spaced from the abutting end of each, a hub member axially slidable through each casing part and drivingly connected thereto, means to clamp the casing parts together, and a cylindrical member interposed between the series of lugs of said casing parts and retained thereby when said casing parts are clamped together, said cylindrical member presenting oppositely directed shoulders to limit the axial sliding movement of said hub members inwardly.

10. In a coupling for shafts or the like, a hollow casing comprising a pair of separable parts, each casing part having a series of lugs depending from the interior periphery thereof spaced from the abutting end of each, a hub member axially slidable through each casing part and drivingly connected thereto, and a cylindrical member interposed between the series of lugs of said casing parts and retained thereby when said casing parts are secured together, said cylindrical member presenting oppositely directed shoulders to limit the axial sliding movement of said hub members inwardly, an end plate secured to each of said casing parts at the outer ends thereof to limit the axial sliding movement of said hub members outwardly and removable means to secure each end plate and the casing part adjacent thereto to the other adjacent part.

11. In a coupling for shafts or the like, a hollow casing comprising a pair of separable parts, each casing part having a series of lugs depending from the interior periphery thereof and spaced from the abutting end of each, a hub member axially slidable through each casing part and drivingly connected thereto, means to clamp the casing parts together, a lubricant retaining ring interposed between annular shoulders upon the internal periphery of each casing part, an end plate over the outer ends of said coupling, and means separate from the first mentioned means to secure each of said end plates to its adjacent casing part.

12. In a coupling for shafts or the like, a hollow casing comprising a pair of separable parts, each casing part having a series of lugs depending from the interior periphery thereof and spaced from the abutting end of each, a hub member axially slidable through each casing part and drivingly connected thereto, an end plate secured to each of said casing parts at the outer ends thereof to limit the axial sliding movement of said hub members outwardly, and removable means to secure each end plate and the casing part adjacent thereto to the other casing part.

In witness whereof, I have hereunto set my hand this 25th day of May, 1926.

WILLIAM E. SYKES.